(12) United States Patent
Lang

(10) Patent No.: US 11,801,469 B2
(45) Date of Patent: Oct. 31, 2023

(54) ACTIVATED CARBON FILTER HAVING BARRIER LAYER

(71) Applicant: A. Kayser Automotive Systems GmbH, Einbeck (DE)

(72) Inventor: Tobias Lang, Gieboldehausen (DE)

(73) Assignee: A. Kayser Automotive Systems GmbH, Einbeck (DE)

( * ) Notice: Subject to any disclaimer, the term of this patent is extended or adjusted under 35 U.S.C. 154(b) by 580 days.

(21) Appl. No.: 17/047,234

(22) PCT Filed: May 16, 2019

(86) PCT No.: PCT/EP2019/062634
§ 371 (c)(1),
(2) Date: Oct. 13, 2020

(87) PCT Pub. No.: WO2019/219818
PCT Pub. Date: Nov. 21, 2019

(65) Prior Publication Data
US 2021/0379526 A1   Dec. 9, 2021

(30) Foreign Application Priority Data

May 17, 2018   (DE) .......................... 102018004002.0

(51) Int. Cl.
*B01D 53/04* (2006.01)
*B01D 53/72* (2006.01)
(Continued)

(52) U.S. Cl.
CPC .......... *B01D 53/0407* (2013.01); *B01J 20/20* (2013.01); *B01J 20/28045* (2013.01);
(Continued)

(58) Field of Classification Search
CPC .... B01D 39/06; B01D 39/20; B01D 53/0462; B01D 2045/2496; B01D 53/04;
(Continued)

(56) References Cited

U.S. PATENT DOCUMENTS 5,260,035 A * 11/1993 Lachman ............ F01N 13/0097
422/177
5,750,026 A    5/1998 Gadkaree et al.
(Continued)

FOREIGN PATENT DOCUMENTS

CN   101850203 A   10/2010
CN   104302382 A   1/2015
(Continued)

*Primary Examiner* — Minh Chau T Pham
(74) *Attorney, Agent, or Firm* — Richard M. Goldberg

(57) ABSTRACT

An activated carbon filter for reducing hydrocarbon emissions, includes a plurality of channels, the channels being suitable for the flow of gases therethrough and at least part of the surface of the channel walls having activated carbon for absorbing and/or adsorbing substances, in particular hydrocarbons; and a filter peripheral wall on the outer periphery of the activated carbon filter; wherein the filter peripheral wall includes a barrier layer, in particular in the form of a coating on the outer surface of the filter peripheral wall, preventing or at least significantly reducing the penetration, in particular the diffusion, of gases and/or substances, in particular hydrocarbon-containing gases, through the filter peripheral wall.

10 Claims, 2 Drawing Sheets

(51) Int. Cl.
*B01J 20/20* (2006.01)
*B01J 20/28* (2006.01)

(52) U.S. Cl.
CPC .......... *B01D 2253/102* (2013.01); *B01D 2253/3425* (2013.01); *B01D 2257/702* (2013.01); *B01D 2259/4516* (2013.01); *B01D 2259/4566* (2013.01)

(58) Field of Classification Search
CPC .......... B01D 53/0407; B01D 2253/102; B01D 2253/342; B01D 2253/3425; B01D 2257/702; B01D 2259/4516; B01D 2259/4566; B01J 12/007; B01J 19/2485; B01J 20/20; B01J 20/28045
USPC ............. 55/522–524; 422/169–172, 177–182
See application file for complete search history.

(56) References Cited

U.S. PATENT DOCUMENTS

| | | | |
|---|---|---|---|
| 6,097,011 A | 8/2000 | Gadkaree et al. | |
| 6,372,289 B1 * | 4/2002 | Hickman | B01D 53/02 428/116 |
| 8,940,072 B2 * | 1/2015 | Boulet | C04B 38/0083 55/524 |
| 9,452,380 B2 * | 9/2016 | Hornbostel | B01J 20/28057 |
| 2004/0250683 A1 * | 12/2004 | Soane | B01D 46/10 55/528 |
| 2006/0101999 A1 | 5/2006 | Steins | |
| 2009/0101119 A1 | 4/2009 | Ammermann | |
| 2015/0258487 A1 | 9/2015 | Hornbostel et al. | |
| 2015/0343418 A1 | 12/2015 | Johnson | |
| 2016/0281562 A1 | 9/2016 | Miyairi et al. | |

FOREIGN PATENT DOCUMENTS

| | | |
|---|---|---|
| CN | 105080481 A | 11/2015 |
| CN | 106256405 A | 12/2016 |
| CN | 106351718 A | 1/2017 |
| CN | 106457206 A | 2/2017 |
| CN | 106999833 A | 8/2017 |
| DE | 69520522 T2 | 7/2001 |
| DE | 102009020703 A1 | 11/2010 |
| EP | 1255691 B1 | 11/2002 |
| WO | 2013119929 A1 | 8/2013 |
| WO | 2015054332 A1 | 4/2015 |

* cited by examiner

ACTIVATED CARBON FILTER HAVING BARRIER LAYER

BACKGROUND OF THE INVENTION

The invention relates to an activated carbon filter and a filter system, in particular as part of a fuel vapor buffer device for reducing hydrocarbon emissions.

The activated carbon filter systems or fuel vapor buffer devices installed in vehicles, which are intended to prevent vapors from the fuel tank from entering the environment, usually comprise activated carbon granules and must be flushed through or regenerated with fresh air on a regular basis. However, the corresponding flushing cycles and flushing volumes are getting smaller and smaller, as a result of which hydrocarbons remain bound in the activated carbon filter, which cannot be completely eliminated due to the possible flushing processes. To test the emissions emanating from a vehicle and thus also from the activated carbon filter system, the vehicle is first subjected to a specific driving cycle. The flushing processes take place during the driving cycle, but they are limited to certain operating states of the vehicle and are consequently no longer sufficient to adequately flush the activated carbon filter system. As a result, hydrocarbons may remain bound in the activated carbon filter system. After the end of the driving cycle, the vehicles are immediately placed in a so-called SHED chamber and are subjected to a test. During the test, the vehicle is not moved, but subject to wide temperature fluctuations. Accordingly, during the SHED test, hydrocarbon emissions emanate from the entire vehicle, which also affects fuel vapors from the tank system including the activated carbon filter system. It has turned out that the problem during the SHED test is not only the evaporation from the tank, but also the evaporation of the harmful hydrocarbons remaining in the activated carbon filter system. For vehicles coming onto the US market, the limits for permissible hydrocarbon emissions are particularly low, so that on this market a separate or additional filter system must very often be employed in the fuel vapor buffer devices in addition to the activated carbon granulate.

Activated carbon filter systems and also the separate or additional filter system as part of the activated carbon filter system are arranged in the vent line of the tank. When refueling and when the tank content expands due to thermal influence, the air in the tank must be discharged through the activated carbon filter system. Thus, the activated carbon filter system is intended to prevent fuel vapors from entering the atmosphere. With activated carbon filter systems it is necessary that a so-called flushing process is always carried out in the meantime. Specifically, atmospheric air is passed through the activated carbon filter system in a reverse manner in order to regenerate the fuel vapor buffer device, i.e. to flush out the hydrocarbon vapors bound in the activated carbon granulate and in the additional filter system. Here, fuel vapors that are not bound in the activated carbon granulate or in the filter of the additional filter system, but in peripheral components such as foams or seals, which are used for fixing or sealing, are also flushed out. After the flushing air has passed the fuel vapor buffer device and is enriched with fuel vapors, it is supplied to the combustion process in the engine.

The separate or additional filter system often comprises a further activated carbon filter with several channels through which the vapors and the flushing air flow, and wherein the channel walls consist of activated carbon in order to bind hydrocarbons. These activated carbon filters are also called honeycomb filters (HCB filters) or monoliths, wherein the channels, viewed in cross section, do not necessarily have to have a honeycomb structure. The HCB filters usually have an elongated shape in order to obtain a large contact area between the vapors or the flushing air and the activated carbon of the channel walls. The HCB filters are usually located in an elongated housing and are held therein with the help of seals and/or foams. The seals and/or foams are also intended to prevent flushing air and in particular fuel vapors from the tank from entering the gap space between the HCB filter and the housing inner wall, thus bypassing the separate or additional activated carbon filter and thus reaching the atmosphere in an unfiltered manner.

Nonetheless, hydrocarbon-containing vapors form in the gap space between the HCB filter and the housing inner wall. On the one hand, this is done by smallest weak points in the seals and/or foams, which are used to fasten the HCB filter in the housing. On the other hand, it was found that hydrocarbons also penetrate through the channel walls and the outer wall of the activated carbon filter, since the channel walls and the outer wall of the activated carbon filter mostly consist of porous activated carbon. In addition, a saturated activated carbon can no longer absorb hydrocarbons, so that the hydrocarbons diffuse through the channel walls made of activated carbon and the outer wall of the activated carbon filter without being bound by the activated carbon. As a result, over time, hydrocarbons or hydrocarbon-containing vapors accumulate in the gap space between the HCB filter and the housing inner wall.

As described above, the gap space is not flushed through by the flushing air, so that the hydrocarbons accumulated there are not removed by the flushing process. Instead, the hydrocarbon vapors in the gap space lead to fast saturation of the activated carbon of the outer wall of the activated carbon filter, so that the filter performance of the separate or additional filter system is considerably reduced. Furthermore, the hydrocarbon vapors can reach the atmosphere through smallest openings in the seal between the outer wall of the HCB filter and the housing inner wall substantially in an unfiltered manner.

SUMMARY OF THE INVENTION

In view of the problem presented, it is an object of the present invention to provide an improved activated carbon filter and an improved activated carbon filter system.

This object is solved by the features of the independent claims. Preferred embodiments are the subject of the dependent claims.

A first aspect of the invention relates to an activated carbon filter for reducing hydrocarbon emissions, in particular for use subsequent to a first filter device of an activated carbon filter system, comprising: a plurality of channels, wherein the channels, viewed in cross section, are formed in a closed manner and are suitable to be flown through by gases, and wherein at least part of the surface of the channel walls has activated carbon for absorbing and/or adsorbing substances, in particular hydrocarbons; and a filter peripheral wall on the outer periphery of the activated carbon filter; wherein the filter peripheral wall comprises a barrier layer, in particular in the form of a coating of the outer surface of the filter peripheral wall, which substantially prevents, but at least significantly reduces, penetration, in particular diffusion, of gases and/or substances, in particular hydrocarbon-containing gases, through the filter peripheral wall.

As a result, an activated carbon filter according to the invention has a filter peripheral wall comprising a barrier layer, so that penetration and/or diffusion of hydrocarbons through the filter peripheral wall is prevented.

Activated carbon filter within the meaning of this application describe filter devices that are suitable for adsorbing and/or absorbing substances and need not necessarily include activated carbon. Activated carbon filters within the meaning of this application can instead and/or in addition to activated carbon also include carbon, zeolites, porous polymers, porous aluminum oxide, porous silicon oxide, molecular sieves, kaolin, titanium oxide and/or cerium oxide for adsorbing and/or absorbing substances. Activated carbon can be obtained from various starting materials, such as wood, wood shavings, sawdust, cotton, peat, coal, coconut, lignite, carbohydrate, petroleum pitch, petroleum coke, coal tar, fruit peels, fruit kernels, nut shells, nut kernels, sawdust, palm trees, vegetables such as rice grain hulls or rice straw, synthetic polymers, natural polymers and/or lignocellulosic material using various methods, such as chemical activation and /or thermal activation. In the context of this application, the term activated carbon is only used exemplarily, since the aforementioned materials can also be used in its place, additionally or alternatively. This applies in particular to the channel walls, the filter peripheral wall, and the activated carbon coating mentioned below.

In a particularly preferred embodiment of the activated carbon filter, the channel walls and the filter peripheral wall substantially consist of activated carbon or a material containing activated carbon. In this preferred embodiment, the filter peripheral wall has an additional coating or sheathing on the surface of the filter peripheral wall facing away from the interior of the activated carbon filter (i.e. on its outer surface). Here, the coating or sheathing consists of a material that essentially prevents and/or significantly reduces the diffusion of gases and/or substances, in particular hydrocarbon-containing gases or hydrocarbons. Further preferably, the coating or sheathing forms a substantially closed, non-porous layer through which gases and/or substances, in particular hydrocarbon-containing gases or hydrocarbons, cannot penetrate.

Further preferably, the filter peripheral wall additionally comprises activated carbon over at least a partial area of the coating or sheathing. In an assembled state of the activated carbon filter, the additional activated carbon is located in the housing in the substantially sealed gap space between the activated carbon filter and the housing inner wall and serves to absorb or adsorb hydrocarbons getting into the gap space despite the barrier layer and sealing devices. Here, it is further preferred that those areas of the coating or sheathing where the sealing devices abut or are attached between the housing inner wall and the outer wall of the activated carbon filter do not have any additional activated carbon, so that the best possible sealing can be achieved in these areas. Alternatively and/or additionally, the coating or sheathing in these areas is cleaned, polished and/or provided with additional adhesives or sealants.

In a further, particularly preferred embodiment, the channel walls and/or the filter peripheral wall consist of a carrier material, in particular plastic and/or ceramic, wherein the carrier material at least partially has a coating comprising activated carbon. The carrier material can be made from a variety of materials and with a variety of manufacturing methods. Plastics, in particular temperature-resistant plastics, and ceramics are particularly suitable. Particularly preferably, the carrier material consists of a material that corresponds to a barrier layer and prevents penetration, in particular diffusion, of gases and/or substances, in particular hydrocarbon-containing gases, through the carrier material of the filter peripheral wall. The carrier material is coated with activated carbon or materials containing activated carbon, which can be done using a variety of methods, for example by immersing the carrier material in an immersion bath with a liquid comprising activated carbon and/or by applying a material containing activated carbon with a spray gun/paint spray gun. Particularly preferably, only the inner side of the carrier material of the channels has a coating of activated carbon. Further preferably, the carrier material of the filter peripheral wall additionally has activated carbon on the outer wall of the activated carbon filter at least over a partial area.

In the event that the carrier material of the filter peripheral wall cannot fully serve as a barrier layer within the meaning of the invention, because it is partially permeable to gas, a barrier layer in the form of a coating can also be applied to the outer surface of the filter peripheral wall.

As mentioned above, it is advantageous for the areas of the filter peripheral wall in contact with the sealing devices to have a surface that is as clean and smooth as possible in order to achieve optimum sealing. Therefore, these areas are preferably freed from the activated carbon coating, for example by grinding off the applied activated carbon coating and/or by covering these areas while the activated carbon coating is being applied.

Preferably, the activated carbon filter is substantially cylindrical. However, the activated carbon filter can also have a polygonal cross section.

Preferably, at least a part, more preferably a majority, of the channels has a cross section that is substantially round, oval, elliptical, triangular, square, pentagonal, hexagonal and/or X-shaped. Alternatively and/or additionally, the channels have different cross-sections and/or are arranged in an ordered and/or diffuse pattern.

Preferably, at least some of the channels are aligned substantially in the axial direction of the filter and/or substantially rectilinear and/or run substantially parallel to one another. Alternatively and/or additionally, at least some of the channels are curved or have windings and/or bends.

A second aspect of the invention relates to an activated carbon filter system, in particular as part of a fuel vapor buffer device for reducing hydrocarbon emissions, comprising: at least one activated carbon filter according to one of the embodiments described above; a housing for accommodating the activated carbon filter; at least one sealing device for substantially tightly closing the at least one gap space between the housing inner wall and the filter peripheral wall of the activated carbon filter so that a penetration of gases and/or substances, in particular hydrocarbon-containing gases, into the at least one gap space is substantially prevented, or at least significantly reduced.

The activated carbon filter system according to a second aspect of the invention is preferably arranged on the atmosphere side of a further activated carbon filter system, which preferably comprises activated carbon granules. The activated carbon filter system can also be used individually and/or in arbitrary combination with one or more further filter systems, wherein these do not necessarily have to have activated carbon. In particular, two or more of the activated carbon filter systems according to a second aspect of the invention can be used in series and/or in parallel with one another.

Preferably, the sealing devices are attached to one end of the activated carbon filter, so that the largest possible gap space is formed. Further preferably, the sealing devices are formed in a ring shape and enclose the activated carbon filter completely.

The invention will be explained in the following with reference to exemplary embodiments illustrated in figures.

DETAILED DESCRIPTION OF THE DRAWINGS

Figure 1:
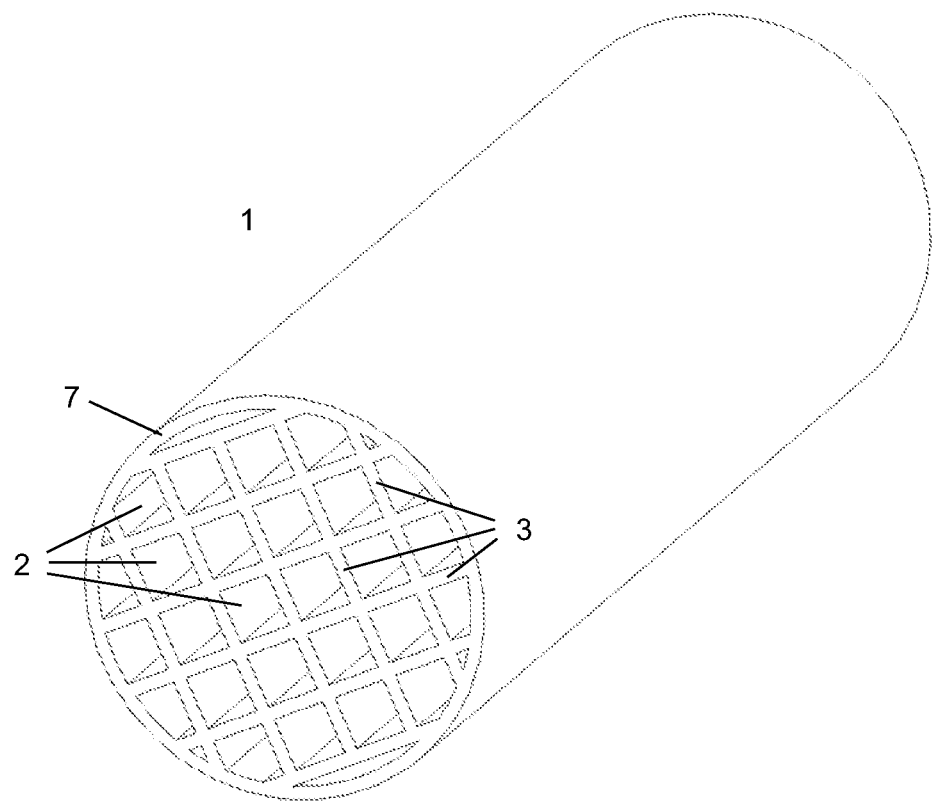
FIG. 1 shows an activated carbon filter according to a first aspect of the invention.

FIG. 1 shows a preferred embodiment of an activated carbon filter 1 according to a first aspect of the invention. The activated carbon filter 1 has a cylindrical shape and comprises channels 2, wherein a plurality of the channels 2 have a square cross section. The filter peripheral wall 7 of the activated carbon filter 1 encloses the channels 2. In this preferred embodiment of the activated carbon filter 1, the filter peripheral wall 7 and the channel walls 3 consist of a carrier material (not shown), which is preferably completely and throughout covered with an activated carbon coating. The carrier material of the filter peripheral wall 7 serves as a barrier layer, which prevents or reduces penetration or diffusion of hydrocarbon-containing gases or hydrocarbons through the filter peripheral wall 7.

Alternatively, only the inner walls of the channels 2 may have, at least in some part(s), an activated carbon coating substantially throughout. Preferably, an activated carbon coating can additionally be applied to the outer surface of the carrier material of the filter peripheral wall 7 at least in some part(s), wherein the areas that are in contact with a sealing means when the activated carbon filter 1 is mounted in a housing 9 do not have activated carbon.

Figure 2:
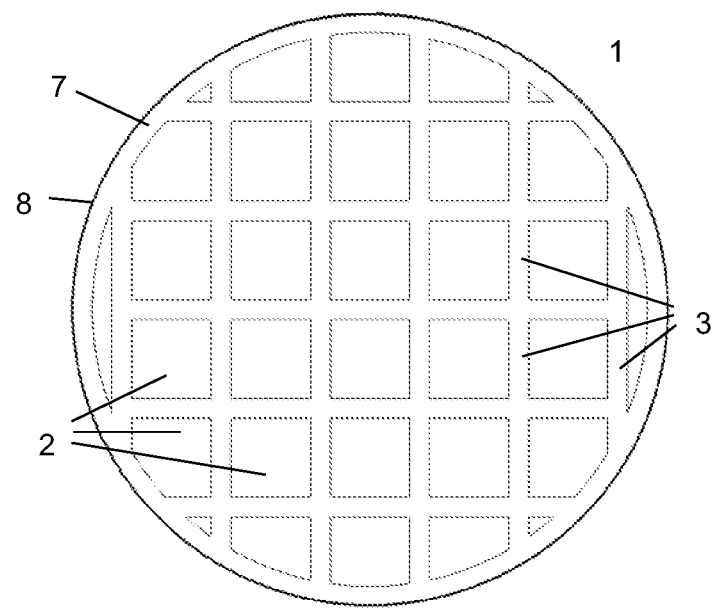
FIG. 2 shows a cross section of an activated carbon filter according to a first aspect of the invention.

FIG. 2 shows a cross section of a further preferred embodiment of an activated carbon filter 1 according to a first aspect of the invention. The activated carbon filter 1 has a round cross section and rectilinear channels 2, wherein a large number of the channels 2 have a square cross section. The activated carbon filter 1 shown has a filter peripheral wall 7 and channel walls 3, which consist of activated carbon or a material containing activated carbon. The filter peripheral wall 7 of the activated carbon filter 1 also has a coating 8, so that the coating 8 forms the outside of the activated carbon filter 1. The coating 8 covers the entire area and prevents or reduces penetration or diffusion of hydrocarbon-containing gases or hydrocarbons through the filter peripheral wall 7.

Preferably, the filter peripheral wall 7 additionally and at least in some part(s) has activated carbon, wherein the areas that are in contact with a sealing means when the activated carbon filter 1 is mounted in a housing 9 do not have activated carbon.

Figure 3:
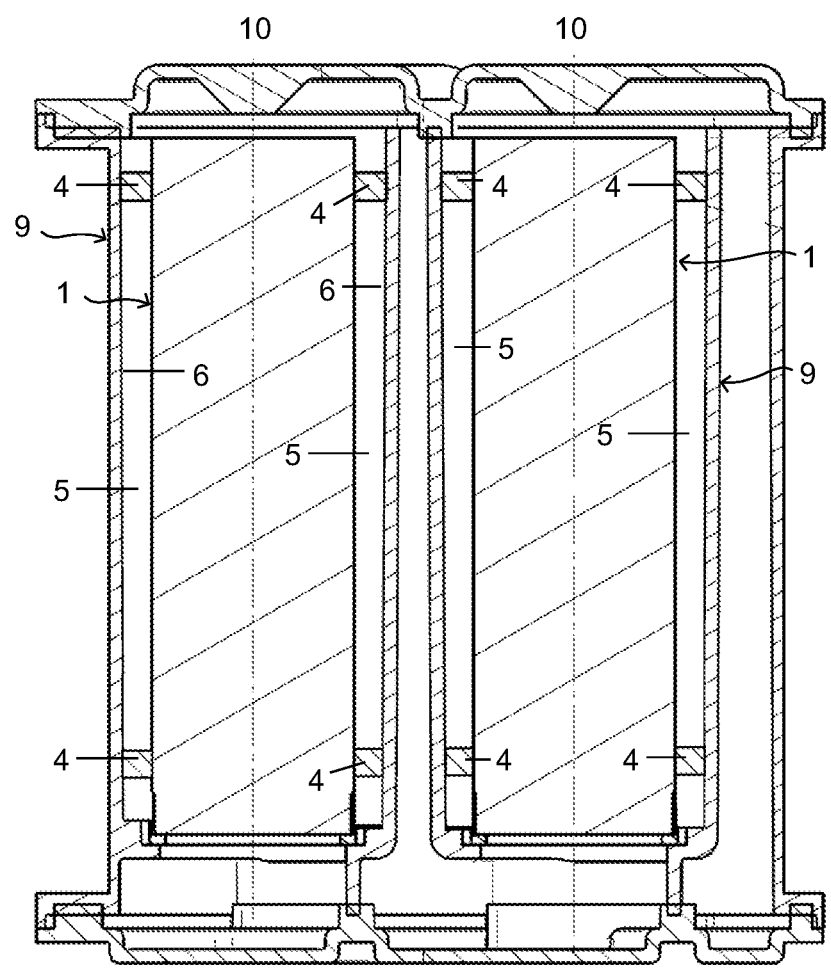
FIG. 3 shows a part of a fuel vapor buffer device comprising two activated carbon filter systems according to a second aspect of the invention.

FIG. 3 shows a part of a fuel vapor buffer device comprising two activated carbon filter systems 10 according to a second aspect of the invention. Each of the activated carbon filter systems 10 has a housing 9, an activated carbon filter 1, two sealing devices 4 completely enclosing the activated carbon filter 1, and a gap space 5 between the housing inner wall 6 of the housing 9 and the activated carbon filter 1. The activated carbon filter systems 10 shown are connected to each another such that the activated carbon filters 1 of the activated carbon filter systems 10 are successively flown through by a supplied gas or air stream.

The fuel vapor buffer device preferably comprises at least a further activated carbon filter system, which is preferably located between tank and the activated carbon filter systems 10 shown, so that fuel vapors from the tank first have to pass the further activated carbon filter system (not shown) before they flow into the filter systems 10 shown. In such a preferred arrangement, one of the activated carbon filter systems 10 according to the invention is in direct contact with the atmosphere (left filter system 10 in FIG. 3). As a result, hydrocarbons located in the gap space 6 of the activated carbon filter system 10 can reach the atmosphere in an unfiltered manner due to a leak in the seal of the upper sealing device 4.

The fuel vapor buffer device shown is flushed through with flushing air in the reverse direction during a flushing process. The filter systems 10 shown are first flushed through before the flushing air flows through the further filter system, not shown, and is finally admixed with the combustion air of the engine. Due to the sealing devices 4, the gap space 5 is not flown through by the flushing air, so that the gap space 5 is not cleaned by the flushing process. Therefore, measures preventing hydrocarbons from penetrating into the gap space 5 between the activated carbon filter 1 and the housing inner wall 6 and preferably additionally allow absorption or adsorption of the hydrocarbons in the gap space 5, are required according to the aspects of the present invention.

LIST OF REFERENCE NUMERALS

1 activated carbon filter
2 channel
3 channel wall
4 sealing device
5 gap space
6 housing inner wall
7 filter peripheral wall
8 coating
9 housing
10 activated carbon filter system

The invention claimed is:

1. An activated carbon filter system as part of a fuel vapor buffer device for reducing hydrocarbon emissions, comprising:
   at least one activated carbon filter for reducing hydrocarbon emissions, comprising:
      a plurality of channels, wherein the channels are suitable to be flown through by gases, wherein at least part of the surface of channel walls which define said channels has a material for absorbing and/or adsorbing substances; and
      a filter peripheral wall on an outer periphery of the activated carbon filter;
      wherein the filter peripheral wall comprises a barrier layer, which at least significantly reduces penetration of gases and/or substances through the filter peripheral wall; and
   a housing for accommodating the at least one activated carbon filter;
   at least one sealing device for tightly closing a gap space between an inner wall of the housing and the filter peripheral wall of the at least one activated carbon filter, so that a penetration of gases and/or substances into the gap space is at least significantly reduced.

2. The activated carbon filter system according to claim 1, wherein the channel walls and the filter peripheral wall include activated carbon; and wherein the filter peripheral wall comprises a barrier layer in the form of a coating.

3. The activated carbon filter system according to claim 2, wherein the activated carbon filter has activated carbon over at least a partial area of the coating.

4. The activated carbon filter system according to claim 1, wherein the channel walls and the filter peripheral wall include a carrier material; and
wherein the carrier material of the filter peripheral wall serves as a barrier layer, and the carrier material at least partially has an activated carbon coating.

5. The activated carbon filter system according to claim 4, wherein only an inner side of the carrier material which at least partially defines the channels has an activated carbon coating.

6. The activated carbon filter system according to claim 4, wherein the carrier material of the filter peripheral wall has activated carbon on an outer wall of the activated carbon filter at least over a partial area.

7. The activated carbon filter system according to claim 1, wherein the activated carbon filter is substantially cylindrical; and
wherein the channels are aligned in an axial direction of the filter.

8. The activated carbon filter system according to claim 1, wherein:
said material is activated carbon;
said substances are hydrocarbons; and
said penetration is diffusion; and
said gases and/or substances are hydrocarbon-containing gases.

9. The activated carbon filter system according to claim 4, wherein the carrier material is one of:
plastic or
ceramic.

10. The activated carbon filter system according to claim 1, wherein the gases and/or substances are hydrocarbon-containing gases.

* * * * *